No. 896,459.
PATENTED AUG. 18, 1908.
J. McL. PETTYJOHN.
MOLD APPLIANCE.
APPLICATION FILED APR. 30, 1907.
4 SHEETS—SHEET 1.
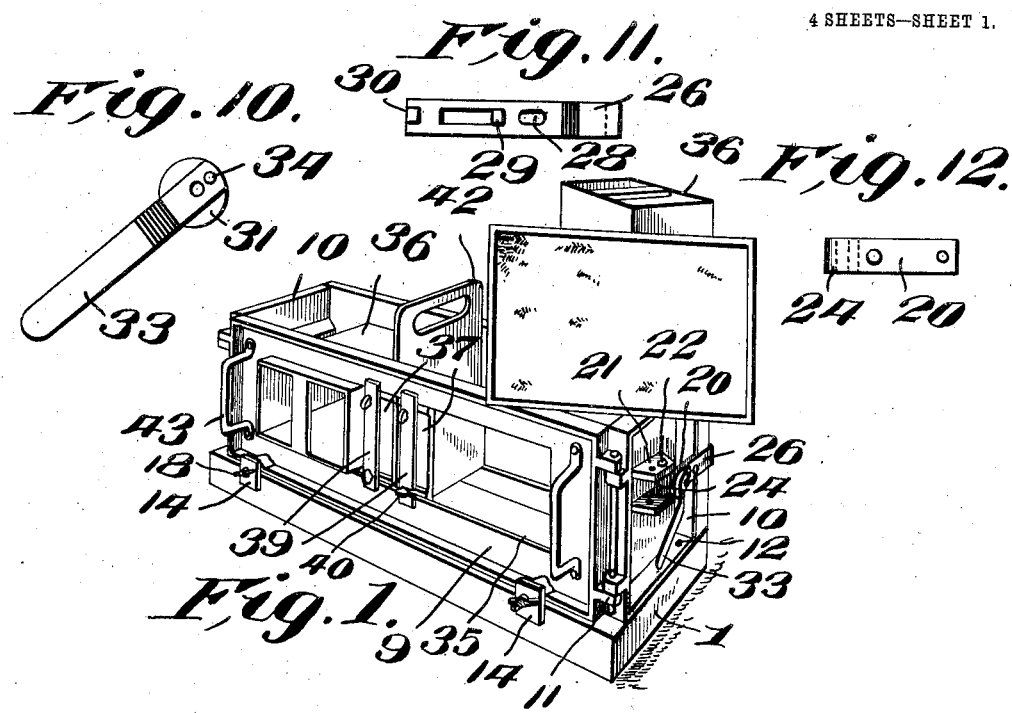
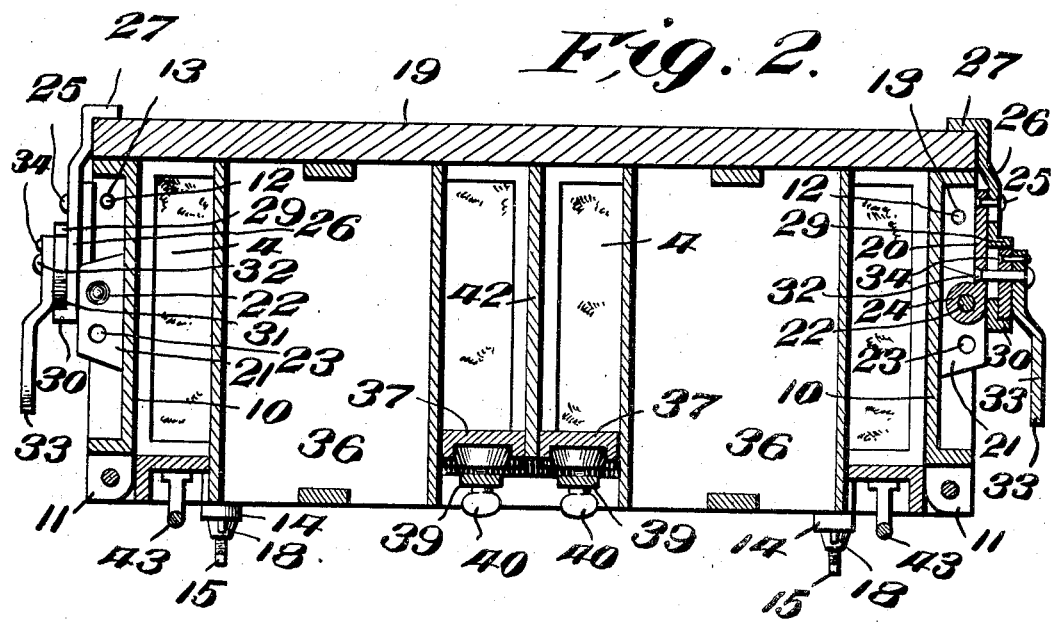
WITNESSES:
INVENTOR
J. McL. Pettyjohn
BY W. J. FitzGerald
Attorneys

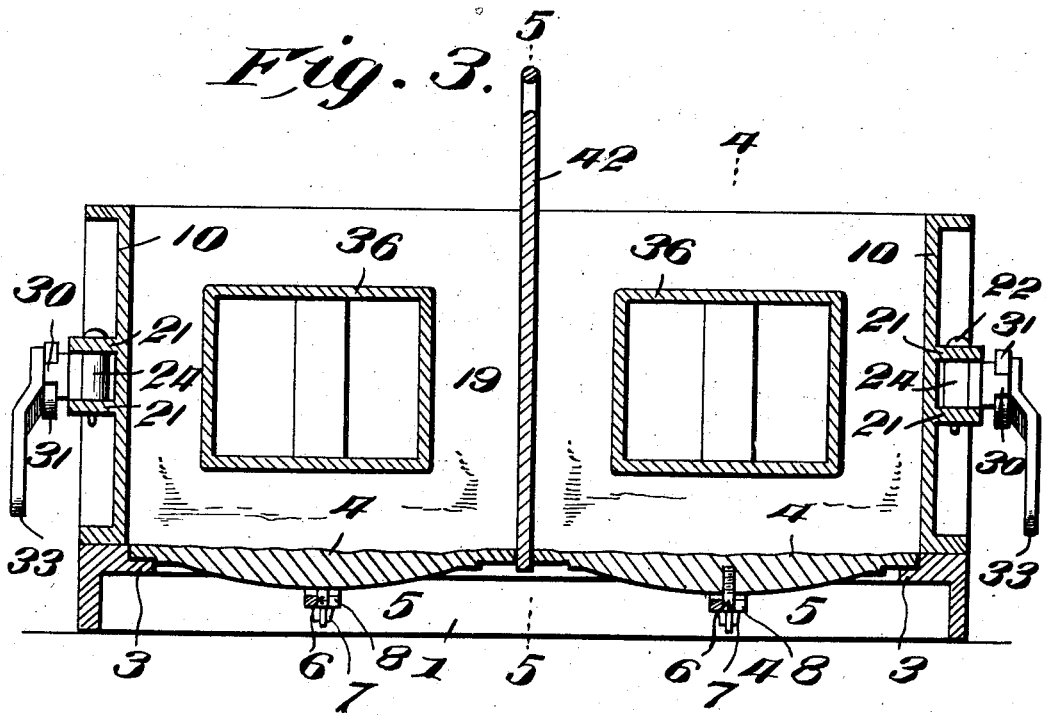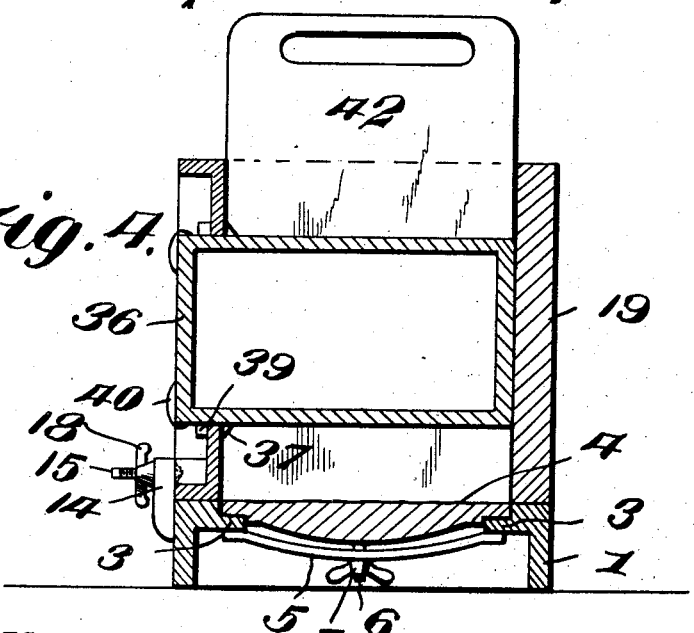

No. 896,459.
PATENTED AUG. 18, 1908.
J. McL. PETTYJOHN.
MOLD APPLIANCE.
APPLICATION FILED APR. 30, 1907.
4 SHEETS—SHEET 3.
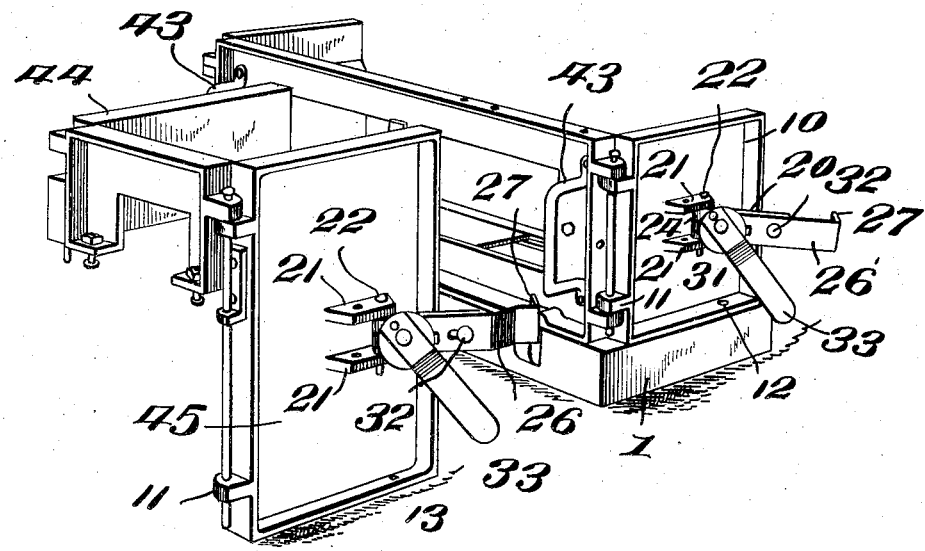
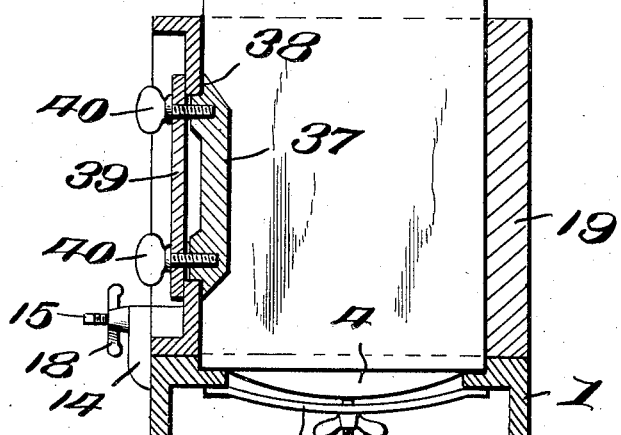
WITNESSES:
Thos. W. Riley
S. F. Head
INVENTOR
J. McL. Pettyjohn
By
W. J. FitzGerald & Co.
Attorneys No. 896,459.  
PATENTED AUG. 18, 1908.  
J. McL. PETTYJOHN.  
MOLD APPLIANCE.  
APPLICATION FILED APR. 30, 1907.

4 SHEETS—SHEET 4.

WITNESSES:  
INVENTOR  
J. McL. Pettyjohn  
By W. J. FitzGerald & Co.  
Attorneys

UNITED STATES PATENT OFFICE.

JOHN McLAREN PETTYJOHN, OF TERRE HAUTE, INDIANA.

MOLD APPLIANCE.

No. 896,459.      Specification of Letters Patent.      Patented Aug. 18, 1908.

Application filed April 30, 1907. Serial No. 371,180.

*To all whom it may concern:*

Be it known that I, JOHN MCLAREN PETTYJOHN, a citizen of the United States, residing at Terre Haute, in the county of Vigo and State of Indiana, have invented certain new and useful Improvements in Mold Appliances; and I do hereby declare the following to be a full, clear, and exact description of the invention, such as will enable others skilled in the art to which it appertains to make and use the same.

My invention relates to new and useful improvements in mold appliances and more particularly to that class adapted to be used for molding blocks for building purposes and like constructions, and my object is to provide a mold of this class which can be readily assembled together and separated to release the molded article.

A further object is to provide means for holding the several parts of the mold together while material is being placed in the mold.

A still further object is to provide means for forming various shaped blocks when desired.

A further object is to provide means for forming faces upon the blocks of various contours and designs.

Other objects and advantages will be hereinafter referred to and more particularly pointed out in the claims.

Figure 6:
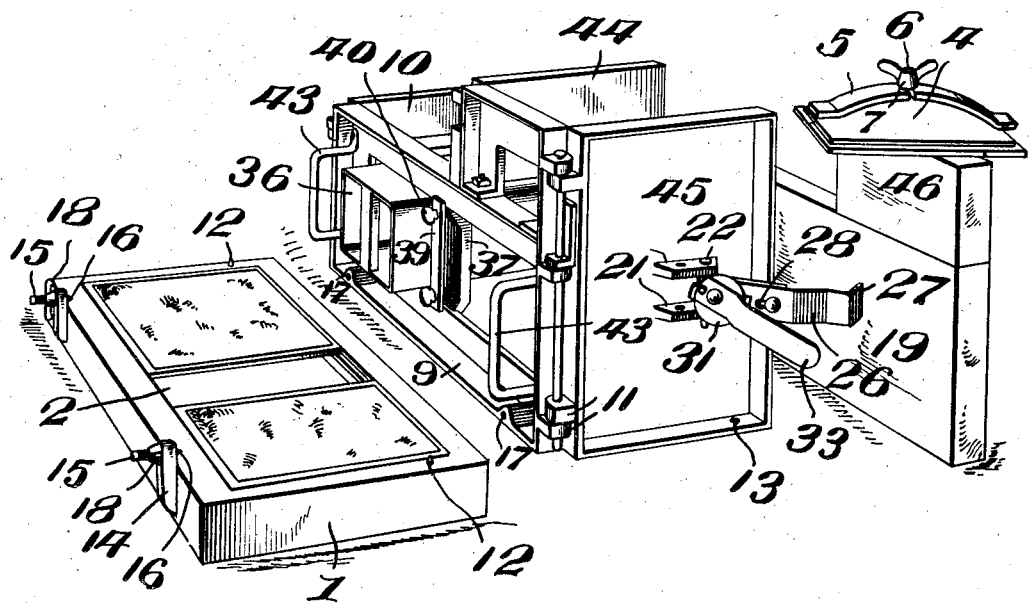
Figure 7:
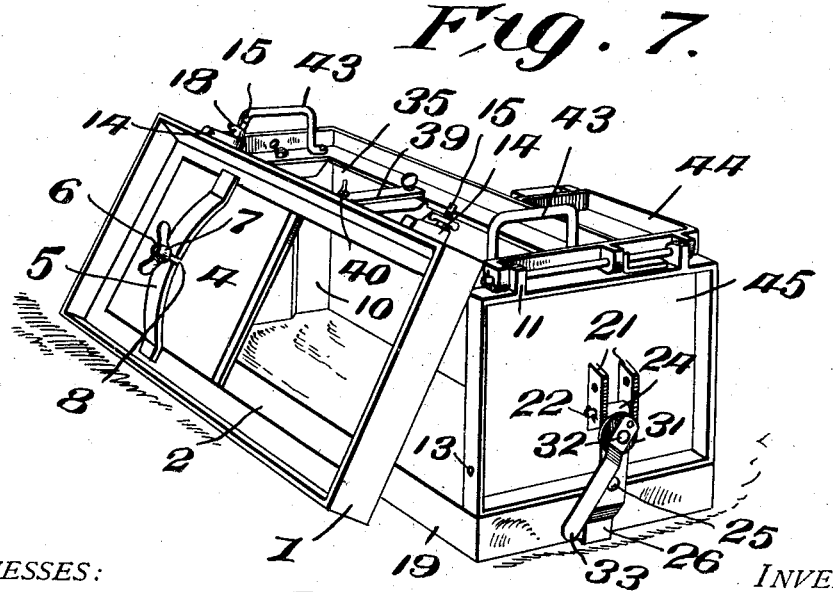

In the accompanying drawings which are made a part of this application Figure 1, is a perspective view of my improved form of mold showing one end thereof in readiness to receive material to form the block while parts of the opposite end are removed and shown resting upon the mold. Fig. 2 is a longitudinal, central, horizontal sectional view through the mold in its assembled position. Fig. 3 is a vertical central longitudinal sectional view through the mold. Fig. 4 is a transverse vertical sectional view as seen on line 4—4, Fig. 3. Fig. 5 is a similar view as seen on line 5—5, Fig. 3. Fig. 6 is a perspective view of the mold showing parts thereof removed from position and showing the attachment employed for forming L shaped blocks. Fig. 7 is a perspective view showing the mold in position to release the block. Fig. 8 is a perspective view showing the mold and attachment therefor before placed in position. Fig 9 is a plan view of a latch employed for securing the spacing devices in position on the mold. Figs. 10, 11, and 12 are plan views of the parts forming the clamping mechanism for securing the mold in its assembled position.

Referring to the drawings in which similar reference numerals designate corresponding parts throughout the several views, 1 indicates the base of my improved mold, said base having an oblong cavity 2 therein, around the edge of which is formed a ledge 3, upon which are adapted to rest plates 4, said plates being employed for forming the faces of the blocks, the upper surface of said plates having various depressions therein. The plates 4 may be of sufficient length to extend the full length of the cavity in the base 1, or may be made of shorter lengths as desired to form two or more blocks at the same time, and the plates are secured in position upon the ledge in any preferred manner, as by securing to the central portion of the plate, a locking bar 5, said bar being held in position on the plate by means of a bolt 6. The locking bar is of sufficient length to extend below and engage the ledges when disposed at right angles to the longitudinal plane of the cavity, and is held in engagement with the ledges, by directing a wing nut 7 onto the bolt 6, and in order to facilitate the removal of the bar when the plates are to be removed from the base, the bar is provided with a slot 8, which extends inwardly from one side of the bar, in which the bolt 6 is seated, and in removing the bar, the nut 7 is turned outwardly on the bolt sufficiently to release pressure on the bar, when the bar may be moved laterally and released from the bolt.

Extending along one edge of the base 1 is a frame 9, said frame being designed to form one wall of the mold and has hingedly secured to each end thereof doors 10 which form the end walls of the mold and said doors are prevented from swinging upon their hinges 11 by means of a pin 12 on the base 1, entering a bore 13 in the lower edge of the doors, and it will be seen that as long as the mold is resting upon the base 1, said doors will be held against swinging movement, the pins being located adjacent the free edge of the doors.

Extending upwardly from one wall of the base 1 are ears 14 through which extend adjusting bolts 15, the inner ends 16 of said bolts being tapered and adapted to enter sockets 17, in the frame 9, the sockets being flared so that the tapered ends of the bolts can have a pivotal movement in the sockets when the mold is turned in position to release the block from the mold. The adjusting bolts 15 are also provided with wing nuts 18 so that the depth to which the tapered ends enter the sockets 17 can be regulated. By this construction it will be seen that when the pins 12 are in engagement with the bores 13, and the adjusting bolts in engagement with the socket 17, the side and end walls of the frame will be held against casual displacement upon the base.

Resting upon the opposite edge of the base from that occupied by the frame 9 and engaging the free edges of the doors 10 is a pallet 19 which forms the opposite wall of the mold, and is secured in position by means of clamps, the body portions 20 of which are pivotally and adjustably mounted between ears 21 on the doors 10, the pivot pin 22 being directed through registering openings 23 and through an eye 24 on one end of the body and slidably mounted upon the free end of the body portion 20 by means of a bolt 25, is a clamp arm 26, at the outer end of which is an inwardly extending foot 27 which is adapted to extend over and engage the outer face of the pallet 19, the clamp arm having an elongated slot 28 therein through which the bolt 25 extends and by which means the clamp arm is permitted to move longitudinally on the body portion. The inner end of the clamp arm 26 is provided with lugs 29 and 30 between which is located a cam 31, said cam being eccentrically secured to the body portion 20 by means of a shaft 32, and it will be seen that when the cam is rotated that the foot 27 will be moved into or out of engagement with the outer face of the pallet 19, and in order to readily operate the cam, I provide a lever 33 which is also mounted upon the shaft 32 and fixed to the cam 31 by means of a bolt 34. By this construction it will be seen that when it is desired to secure the pallet in position upon the base, the foot 27 of the clamp arm 26 is directed into engagement with the outer face of the pallet and the cam 31 then rotated which will result in moving the clamp arm 26 inwardly until the foot engages the pallet, and when it is desired to release the pallet the cam 31 is rotated in the opposite direction and the foot 27 released from impingement with the pallet, when the body portion 20 may rotate upon the pivot pin 22 and the foot 27 removed from contact with the pallet, and in order to use pallets of different thicknesses the ears 21 are provided with a plurality of the openings 23 so that the body may be adjusted between the ears.

The frame 9 is provided with a longitudinally disposed slot 35 which extends substantially the full length of the frame and is adapted to receive cores 36 employed in forming the openings in the blocks, and when two or more of the blocks are being molded at the same time, I provide core spacers 37 to hold the cores in position in the mold, said core spacers having shoulders 38 at each end thereof which engage the edge walls of the slot 35, and the spacers are held in position by means of a latch 39 which is placed on the out side of the frame 9, and is of sufficient length to extend beyond each edge of the slot 35, and is secured to the spacer by means of bolts 40, the upper bolt extending through an opening in the latch and into a threaded socket in the spacer while the lower end of the latch is provided with a notch 41 to receive the lower bolt, the object of said notch being to provide means for quickly releasing the core spacer from the frame, and it will be seen that by slightly loosening the lower bolt 40 and then turning the latch to a horizontal position the spacer can be readily removed from the frame.

In placing the cores in position said cores are inserted lengthwise through the slot 35 until the inner ends thereof engage the pallet 19 when the core is moved laterally until one edge thereof engages one end of the slot 35, after which a core spacer is placed in position and moved into engagement with the opposite edge of the core and fixed in this position by securing the latch with the bolts 40.

When two or more of the blocks are to be molded I provide a partition 42 which extends vertically through the mold between the frame 9 and pallet 19, and the lower end thereof is placed between the meeting edges of the plates 4 as shown in Fig. 3, while one edge of the partition is secured between the core spacers 37 as best shown in Fig. 2 of the drawings, thereby positively fixing the partition in the mold.

In operation, the frame 9 and pallet 19 are secured in position on the base after which the material forming the block is tamped in the mold and on to the frames 4 until the lower edge of the slot 35 is reached, when the cores 36 are placed in the mold and secured in position, then the material is tamped around the core to the upper edge of the mold and that portion of the material extending above the mold is then struck off in the usual manner thereby finishing the block. After this operation is performed the mold is turned until the same rests upon the pallet 19, this result being readily accomplished by grasping handles 43, which are secured to the frame 9, and after the mold is thus disposed the cams 31 are operated to release the clamp arms from the pallet, and after the clamps have thus been released they are swung outwardly on their pivot pins until entirely released from the pallet. The lower edge of the frame 1 is then swung outwardly until the pins 12 are out of engagement with the bores 13; said base pivoting on the tapered end of the adjusting bolts 14; then by swinging the doors 10 outwardly on their hinges the frame 9 can be readily removed from position around the blocks, the cores 36 having previously been removed from the mold.

For convenience of handling the blocks while in their green state they are left upon the pallet until sufficiently dried to be handled without danger of destroying the same, and as soon as the parts of the mold have been removed from around the blocks, the frame is again placed in position over the base and a new pallet secured in position after which the molding operation is repeated.

When a block is made the full length of the mold the partition 42 is dispensed with, and when more than two blocks are molded at the same time, an additional number of partitions are employed to properly divide the blocks in lengths, and when a single block is being molded but one plate 4 is used, while when a plurality of the blocks are being molded at the same time, a plate for each block is employed, and if desired a long and a short block may be molded at one and the same time by properly spacing the cores and partition, in which case one of the plates 4 is shorter than the other.

In forming the blocks for the corner of the building it is preferable to have said blocks substantially L shaped and to this end I provide an attachment for the mold which consists of an auxiliary frame 44, which is substantially L shaped and bolted to the upper edge of the frame 9, and at one end thereof, one section of the auxiliary frame extending across the upper edge of the mold and resting upon the upper edge of the pallet 19 and to compensate for the increased height produced by the auxiliary frame, I dispense with the door 10 at this end of the mold and employ an auxiliary door 45, which is secured in position the same as the door 10, and is provided with the usual form of clamp for securing the pallet in position, while the pallet is provided with an extension 46 to form a wall for the open end of the auxiliary frame, the operation of the mold in this instance being the same as when the straight block is being molded, these features being best shown in Figs. 6, 7 and 8 of the drawing.

It will now be seen that I have provided a very cheap and economical form of mold and one that can be readily and quickly operated, and it will further be seen that blocks of various shapes and sizes may be produced the faces of which are formed with various designs.

What I claim is:

1. In a mold, a bottom frame-member, an additional frame-member, end-members and a pallet, said additional frame-member having upon the upper surface of one longitudinal portion thereof, upraised sockets, and said bottom frame-member having applied to the outer surface of one longitudinal edge thereof, upwardly extending ears and nut-equipped adjusting bolts inserted through said ears and engaging said sockets, means for pivotally connecting said end-members to said additional frame-member and connecting means between said pallet and said end-members.

2. In a mold, a bottom frame-member, end-members, an additional frame-member and a pallet, said additional frame-member having upon the upper surface of one longitudinal portion thereof, upraised sockets having outwardly flared surfaces and said bottom frame-member having applied to the outer surface of one longitudinal portion thereof, upwardly extending ears, nut-equipped adjusting bolts engaging said flared sockets and adapted to serve as pivots for the outward tilting of said additional frame-member, means for pivotally connecting said end-members to said additional frame-member, and connecting means between said pallet and said end-members.

3. In a mold, a bottom frame member, an additional frame-member, a pallet and end members, said additional frame-member being equipped with sockets upon the upper surface of one longitudinal portion thereof and said bottom frame-member having a corresponding portion thereof provided with ears upon its outer surface, nut-equipped adjusting bolts inserted through said ears and engaging said sockets to serve as pivots for the outward tilting of said bottom frame-member, means for pivotally connecting said end-members to said additional frame-member and connecting means between said end-members and said pallet, including clamping members engaging said pallet and connected to additional members having pivotal connection with apertured lugs or ears on said end-members and means for actuating said pallet clamping-members.

4. In a mold, a bottom frame member having insertible bottom plates, an additional frame member having said bottom-frame member hinged or pivoted thereto along a longitudinal edge thereof, end members also hinged or pivoted to said additional frame member and having apertured lugs or ears, a pallet and means for the retention of said pallet upon said end members opposed to said additional member, embracing clamping members engaging said pallet and connected to additional members having pivotal connection with said end member lugs or ears, and means for actuating said pallet clamping members.

5. In a mold, a bottom frame member having insertible bottom plates, an additional frame member having said bottom frame member hinged or pivoted thereto along a longitudinal edge thereof, end members also hinged or pivoted to said additional frame member and having apertured lugs or ears, a pallet and means for the retention of said pallet upon said end-member opposed to said additional frame member, embracing clamping members engaging said pallet and connected to additional members having pivotal connection with said end member lugs or ears and manually actuated cams connected to said latter additional members and adapted to actuate said pallet clamping members.

In testimony whereof I have signed my name to this specification in the presence of two subscribing witnesses.

JOHN McLAREN PETTYJOHN.

Witnesses:
GEORGE F. ASBURY,
FRED. A. STALNAKER.